March 7, 1961 J. R. OISHEI 2,973,714
HYDRAULICALLY POWERED WINDSHIELD WIPER SYSTEM
Filed March 1, 1957
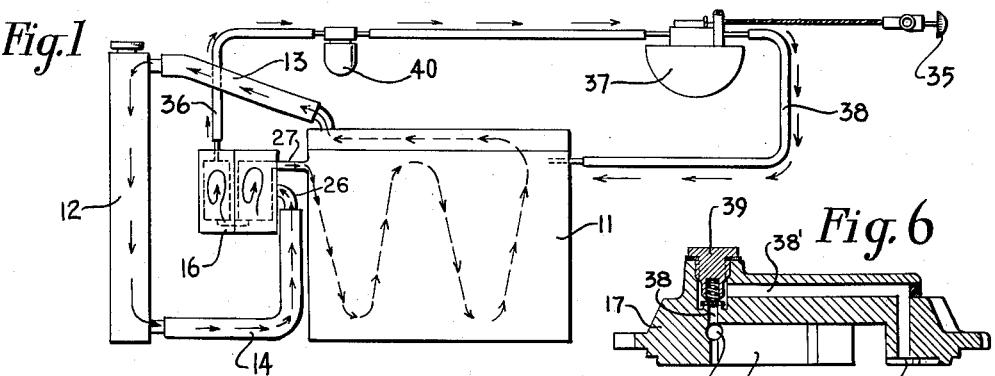
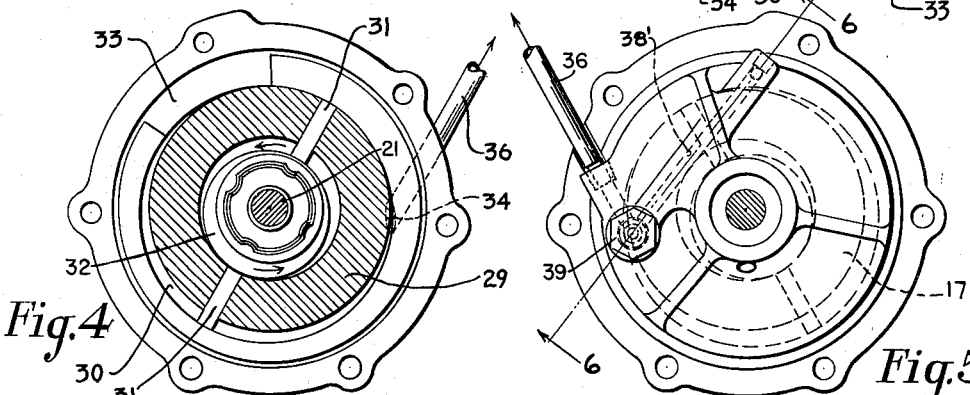
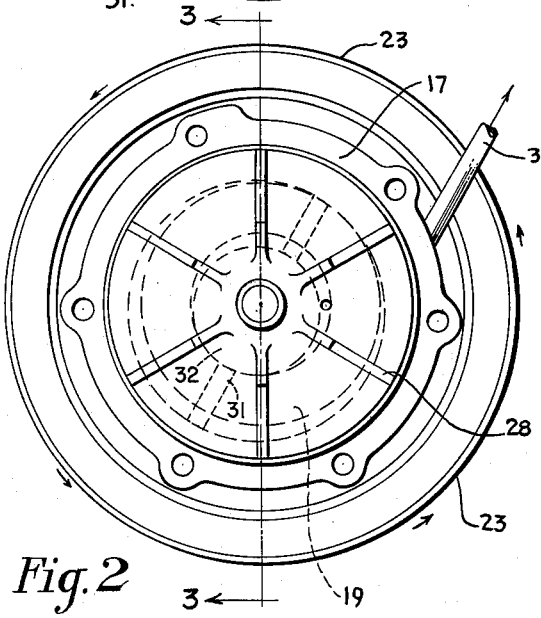
INVENTOR.
JOHN R. OISHEI
BY
Bean Brooks Buckley & Bean
ATTORNEYS

2,973,714

HYDRAULICALLY POWERED WINDSHIELD WIPER SYSTEM

John R. Oishei, Buffalo, N.Y., assignor to Trico Products Corporation, Buffalo, N.Y.

Filed Mar. 1, 1957, Ser. No. 643,443

3 Claims. (Cl. 103—5)

This invention relates to vehicle windshield wiper systems, and more particularly to a system utilizing engine coolant for powering a hydraulically operable wiper motor.

Various types of power systems have been proposed and utilized for the operation of windshield wiper motors, including those using hydraulic fluid such as lubricating oil. One advantage of hydraulically powered wiper motors is the fact that they can be of smaller size than an equivalent torque-rated vacuum powered wiper motor thus providing space saving possibilities. The present system, which represents a new and novel approach to the problem of powering a hydraulically operable wiper motor, employs a compound water pump which circulates the engine coolant and also directs a certain amount thereof to a hydraulically operable wiper motor. The use of engine coolant avoids difficulties caused by variable viscosity such as may be experienced with oil under changing temperature conditions. The pump is of such design as to require no greater space than the ordinary water circulating pump, and provides a reliable source of pressurized hydraulic medium for operation of the wiper motor.

The main object of this invention is to provide a system utilizing engine coolant for powering a hydraulically operable wiper motor.

Another object of the invention is to provide a pump means operable in a dual capacity, namely, to circulate engine coolant through the engine, and also to direct a certain amount of coolant through a hydraulically operable wiper motor.

A further object of this invention is to provide a source of hydraulic power for a wiper motor which affords space saving possibilities.

These and further objects and features of the invention will become more apparent from the following description and the accompanying drawing wherein:

Fig. 1 is a schematic view illustrating the system of the invention;

Fig. 2 is an interior end view of a compound pump used in the system of the invention;

Fig. 3 is a section view as seen from line 3—3 in Fig. 2;

Fig. 4 is a section view as seen from line 4—4 in Fig. 3;

Fig. 5 is an opposite end view of the pump of Fig. 2; and

Fig. 6 is a section view as seen from line 6—6 in Fig. 5.

Referring now to the drawing and more particularly to Fig. 1, numeral 11 identifies a motor vehicle engine which is connected to a radiator 12 by means of hoses 13 and 14 arranged for the circulation of coolant through the engine and radiator. Connected to the engine is a pump assembly 16, which includes a front housing 17, a rear housing 18, and an impeller 19, the latter being supported upon one end of a shaft 21. Bearing 20 and bushing 25 support the shaft 21 in the front housing 17. Affixed to the opposite end of the shaft is a collar 22 to which is attached a fan pulley 23 having grooves 24 for reception of driving belts (not shown).

The rear housing 18 has a centrally arranged coolant intake portion 26 and a peripherally arranged coolant outlet portion 27 whereby engine coolant may be introduced at the center of the impeller and moved outwardly under action of impeller blades 28. The hose 14 is affixed to the intake portion 26, while the outlet portion 27 is connected with the engine.

The impeller 19 has a circular portion 29 which extends into a recess 30 formed in the front housing 17, and is arranged to slidably support blades 31, the outer edges of which engage the wall of recess 30, the inner ends of which engage a cam surface 32 likewise formed in the front housing 17. The outer periphery of recess 30, as well as the outer periphery of the cam surface 32, are concentrically arranged relative to each other; however, both are eccentrically arranged with respect to the axis of shaft 21. A clearance area 33, arranged between the side of impeller 19 and the front housing 17, allows coolant to pass around the impeller and into the recess 30 where it is moved along by the blades 31 to an opening 34 forming the end of a discharge pipe 36. The pipe 36 is connected to a wiper motor 37 which is regulated by a control knob 35 located for convenient manipulation by the vehicle operator. A pipe 38 is provided for conducting the coolant back into the engine 11. A passageway 38' connects with the opening 34 at one end and with the clearance area 33 at the other end, which passageway serves as a by-pass to divert coolant from the discharge pipe 36 after a maximum pressure is obtained. Maximum pressure may be regulated by an adjustable spring loaded valve 39 arranged in the passageway 38', as best seen in Fig. 6. A liquid strainer or filter element 40, is arranged in the hose 36.

It will be seen that when coolant enters the pump via the intake portion 26, the impeller 19 will circulate a major portion into the cooling circuit of the engine by way of outlet portion 27, while a certain amount of the coolant will pass into a recess 30 via clearance area 33 and be moved into the discharge pipe 36 by action of the blades 31 as the impeller rotates. The pump 16 thus acts as an impeller for centrifugally moving the coolant through the pump and into the engine, and also as a positive displacement pump for pressurizing and moving the coolant into the discharge pipe 36 for operation of the wiper motor 37. At those times when the wiper motor 37 is not being used, or if the coolant pressure exceeds a predetermined maximum, the coolant being moved by the blades 31 will be circulated within the pump via passageway 38', thus reducing high-pressure strain on the wiper motor.

The foregoing description has been given in detail without throught of limitation since the inventive principles involved are capable of assuming other physical embodiments without departing from the spirit of the invention and the scope of the appended claims.

What is claimed is:

1. A compound pump means including a front housing, a rear housing, a pump element enclosed by said housings, and a shaft rotatably supported in said front housing, said shaft having said pump element affixed thereto at one end and shaft rotating means affixed thereto at the opposite end, said pump element having an impeller blade portion arranged to receive coolant and to discharge coolant through a first outlet and also having a sliding blade portion arranged in said front housing, and means for diverting a given amount of such coolant to said sliding blade portion for delivery under pressure through a second outlet.

2. A compound pump means including a front housing, a rear housing, a pump element enclosed by said housings, and a shaft rotatably supported in said front housing, said shaft having said pump element affixed thereto at one end and a shaft rotating means affixed thereto at the opposite end, said pump element having an impeller blade portion arranged to receive and circulate coolant and also having a sliding blade portion arranged in said front housing for receiving coolant from said impeller portion and delivering the same under pressure through an outlet, said front housing having means including by-pass means communicating with said impeller portion and arranged to recirculate coolant through said impeller portion and thereby regulate the maximum coolant pressure through said outlet.

3. A compound pump means including a front housing, a rear housing, a pump element enclosed by said housings, and a shaft rotatably supported in said front housing, said shaft having said pump element affixed thereto at one end and a shaft rotating means affixed thereto at the opposite end, said pump element having an impeller blade portion arranged to receive coolant and discharge the same through a first outlet and also having a sliding blade portion arranged in the front housing and receiving coolant passing through said impeller portion for delivery under pressure through a second outlet, said front housing having by-pass means including an adjustable flow control valve arranged to recirculate coolant through said impeller portion and thereby limit coolant flow through said second outlet when the pressure of coolant being delivered therethrough attains a predetermined maximum.

References Cited in the file of this patent

UNITED STATES PATENTS

| | | |
|---|---|---|
| 1,936,935 | Fitch et al. | Nov. 28, 1933 |
| 1,978,480 | Svenson | Oct. 30, 1934 |
| 2,443,527 | Wirth et al. | June 15, 1948 |
| 2,766,589 | O'Leary | Oct. 16, 1956 |
| 2,845,871 | Compton | Aug. 5, 1958 |

FOREIGN PATENTS

| | | |
|---|---|---|
| 2,284 | Great Britain | Sept. 3, 1908 |